INVENTOR
AVERY B. SMITH

United States Patent Office 3,681,027
Patented Aug. 1, 1972

3,681,027
COLORIMETRIC INDICATOR FOR THE DETECTION OF NITROGEN DIOXIDE
Avery B. Smith, Wallingford, Conn., assignor to Resource Control, Inc., West Haven, Conn.
Continuation of abandoned application Ser. No. 692,842, Dec. 22, 1967. This application May 28, 1971, Ser. No. 148,231
Int. Cl. G01n 31/22
U.S. Cl. 23—232 R
4 Claims

ABSTRACT OF THE DISCLOSURE

A small, pocket type of "field use" indicator of the colorimetric type for detecting and indicating nitrogen dioxide contamination in an atmosphere, in which a powder compact of diazotizing, coupling and stabilizing agents is mechanically supported in suitable manner to provide a self-contained, one-time indicator unit that is discarded after use.

Figure 1:
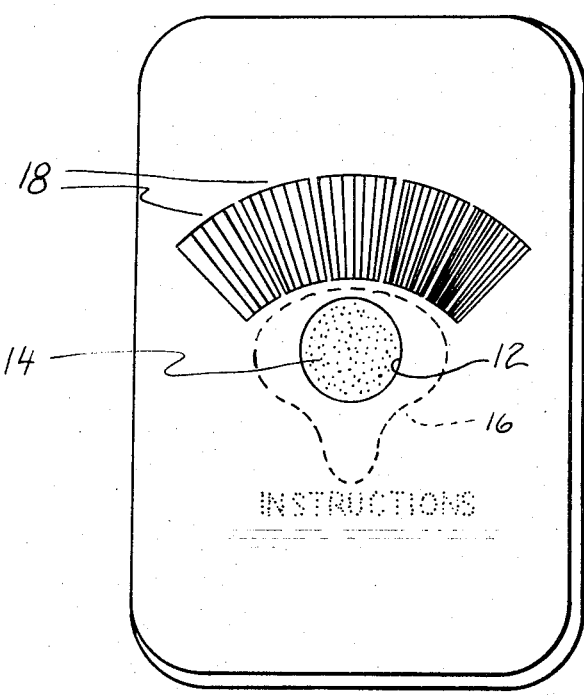

This invention relates to detection of nitrogen dioxide in an atmosphere and to means for providing a visual indication thereof comprising more particularly stabilized powder compact indicator compositions which change color on exposure to nitrogen dioxide contaminated atmosphere. The invention is further concerned with the provision of a simple, reliable indicator device using such compositions and small enough to permit a number of them to be carried in the pocket of the user so as to be suitable for one-time use in quickly determining at selected locations whether the atmosphere is contaminated with nitrogen dioxide and to provide an approximate indication of the extent. A unit meeting these requirements which is also of such low cost as to be expendable after a single use is a concurrent objective.

The conventional laboratory procedure for determining the presence of nitrogen dioxide in an atmosphere is based on the use of the Saltzman reaction utilizing a reagent solution as the indicator means. The principal drawbacks to this procedure are that rather elaborate glass equipment is required and the reagent solution has only a limited stability and shelf life. The analysis, because of its complexity, must be performed by trained personnel and the apparatus used in the determination is not easily portable and could not conveniently be used in the field, nor could the analysis be performed with the rapidity desired on many occasions. The problems with the Saltzman procedure have been recognized and proposals advanced for overcoming them. Thus field use types of indicators for nitrogen dioxide have been proposed heretofore which permit tests to be made by personnel not trained in chemical analysis procedures. Those previously suggested have generally utilized a silica gel impregnated with a phenylbenzedine compound and a strong acid. An elongate column or bed of silica gel or other inert granular material carrying the reagent is disposed in a transparent tube, and the indicator material is held in place in the tube by end plugs of porous material, such as glass wool. The ends of the tube are sealed initially and when a test for the presence of nitrogen dioxide is to be made, the end seals are broken and the atmosphere caused to pass through the tube. This is accomplished by an aspirator bulb or other pump mechanism. The presence of nitrogen dioxide is indicated by a blue color change occurring in the impregnated granular material.

Although this arrangement represents a much less complicated test device than that required in following the Saltzman or similar laboratory procedure, it still is not convenient where a large number of tests are to be made. Furthermore, there are storage problems which limit the shelf life of a prepared indicator, with the result that the indicator components must generally be packaged separately and then admixed and placed in the tube shortly before actual use. This is not convenient or practical in many cases.

It is accordingly a general objective of the present invention to provide self-contained test units useful in detecting the presence of nitrogen dioxide in an atmosphere by providing a visual indication such as a color change, which units avoid the several problems discussed above. To this end, it is a more specific objective of the invention to provide dry, powder compact indicator compositions for nitrogen dioxide, and indicator units incorporating such compositions, having substantially better storage capability than similar prior compositions used for the purpose. In order to provide improved quantitative indicating accuracy, a high order of color reproducibility is required and obtained by the presently disclosed indicator compositions. It is a further object to provide indicator units of extremely small size which need no auxiliary equipment to indicate the presence of nitrogen dioxide, being operative merely upon exposure to the atmosphere. The units may also serve for rough quantitative determinations of the amount of contaminant in the atmosphere, this being evidenced by the degree of color change occurring within a given exposure time which can then be compared against known standards. In the preferred embodiment of the invention, a mechanical support for the indicator composition contains on its face a comparative color chart or color standard for known contaminant concentrations, from which an estimate of the amount of nitrogen dioxide in the atmosphere can be made by comparison.

In general, the invention consists in the discovery that diazotizing and coupling agents of the sulfanilic acid—naphthylamine type used in the Saltzman procedure mentioned above may be stabilized by and incorporated with a weakly acidic granular solid by triturating the same with an inert liquid binder such as water or glycerol and then molded or pressed to provide a powder compact having excellent indicator properties. Sulfanilic acid and sulfanilimide are employed as the diazotizing agents, while N(1-naphthyl) ethylenediamine dihydrochloride or acetate are employed as the coupling agents. Suitable stabilizing agents having the requisite whiteness to avoid masking the color change in the indicator composition produced during tests include boric acid and magnesium sulfate or Epsom salt, especially in combination with very fine mesh silica gel. By compacting such composition into pellet form the indicator composition is made self-supporting, and for convenience in use the pellet or button is preferably incorporated in a mechanical carrier, such as a molded plastic planchette having a hole in which the indicator composition is compacted. The surrounding surface of the planchette affords a convenient place for a comparative color chart and/or for suitable instructions on the use of the test unit, more especially when used in making a quantitative determination. To prevent contamination prior to use, the units can be incorporated in a hermetically sealed film or foil packet.

The fact that the test units are of small size renders them very portable and enables the user to transport easily a large number for field testing purposes. Although the units are expendable in that one-time use only is possible, because of their low cost the "throw-away" nature of the units does not render them uneconomic.

Figure 2:
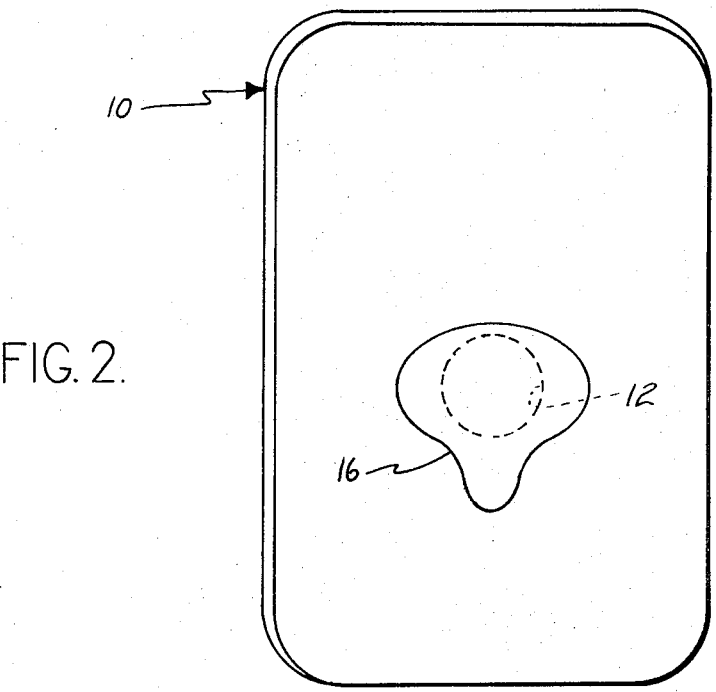

For purposes of illustration of a preferred embodiment of the invention, reference is made to the accompanying drawings in which FIG. 1 is a perspective view of an indicator unit of the type described; and FIG. 2 is a similar view of the reverse side of the unit.

In the illustrative device, a plastic planchette 10 is provided with a central hole 12 in which there is pressed a self-adherent compact or pellet 14 of indicator material. To protect the pellet 14 agains premature exposure, a pressure-sensitive sealing tab 16 is provided on each face of the planchette normally covering the pellet. In using the device, such tabs are of course first peeled off to expose the pellet. For convenience in estimating concentration of contaminant gas, a color chart 18 is incorporated on the face of the planchette adjacent the pellet, with color slips or panels indicating a degree of color change obtained for a fixed time interval on exposure to known concentrations of nitrogen dioxide. The arrangement here described is purely illustrative of one simple form of indicator unit made possible by the invention. In place of the tabs 16, the entire planchette may be sealed in foil or plastic in the form of a packet to protect the device until ready for use.

As illustrative of indicator compositions incorporating the invention, some of those presently preferred are described in the following examples. In each case in these examples the active indicator components are the same and comprises sulfanalic acid (hereinafter referred to as SA) as the diazotizing agent and N(1-naphthyl) ethylenediamine dihydrochloride (hereinafter referred to as NED) as the coupling agent. These are incorporated with the different stabilizing pulverulent carriers, as appear in the examples.

EXAMPLE I

A self-supporting compact was prepared having the following composition:

| | Gm. |
|---|---|
| NED | 0.25 |
| SA | 0.25 |
| Plaster | 2.0 |
| MgSO$_4$ | 3.0 |
| Glycerol | 0.25 |
| Water, 1.5 ml. | |

The active indicator agents are mechanically admixed with the plaster and magnesium sulfate to obtain a homogeneous powder, and then triturated with the glycerine and water. The resulting paste can be formed into a button or pellet and prepared for storage and subsequent use in a protective package as described above. The composition just described produces a pellet of good whiteness so as to afford an excellent basis for detecting color changes when exposed to contaminated atmosphere.

The presence of nitrogen dioxide in the atmosphere is indicated by a change in color of the powder compact or button 14 from its initial white to pink, deepening to dark purple or almost black with increased concentration of the contaminant and/or length of exposure.

In this example, the indicator gave a light pink response to a 15-minute exposure in an atmosphere containing 3.4 p.p.m. NO$_2$. In the same period of time, the indicator became a medium violet when exposed to an atmosphere containing 10.3 p.p.m. NO$_2$ and a dark purple color in the presence of 32.6 p.p.m. NO$_2$. After four months storage the composition gave a medium violet indication for 8.6 p.p.m. NO$_2$, showing that it has good stability.

EXAMPLE II

A powder composition was prepared having the following composition:

| | Gm. |
|---|---|
| NED | 0.25 |
| SA | 0.25 |
| Boric acid | 4.5 |
| Talc | 1.0 |
| Silica gel | 1.25 |
| Glycerol, 2.5 ml. | |

Again the indicator agents are mixed with the boric acid, talc and silica gel and then triturated with the glycerol to form a plastic mass that can be smeared on or pressed into a supporting member as before.

In this example, a light purple color was obtained on exposure for 15 minutes to an atmosphere containing 9.3 p.p.m. NO$_2$. After four months storage, the same compostion showed medium-light purple on exposure to an atmosphere containing 12.1 p.p.m. NO$_2$.

EXAMPLE III

A powder composition was prepared with the following composition:

| | Gm. |
|---|---|
| NED | 0.25 |
| SA | 0.25 |
| MgSO$_4$ | 4.5 |
| Plaster | 2.0 |
| Glycerol, 4.5 ml. | |

The indicator composition is mixed and ground with the glycerol as before to produce a compact having the consistency of tough toffee. When exposed for standard 15 minute interval to standardized test atmospheres, the composition shows light purple at 3.7 p.p.m. and medium purple at 10.6 p.p.m. NO$_2$. After four months storage, the medium purple color change occurred at about 26.8 p.p.m. NO$_2$.

Repeatability and suitability of color change are affected by the carrier composition. Initial whiteness and stability are also important in selecting the composition. In order to test out the various properties, a series of compositions was prepared and the results evaluated. These are reported in the accompanying Table 1 and Table 2, respectively. In all tests the active indicator components used were equal (0.25 g.) amounts of N(1-naphthyl) ethylene-diamine dihydrochloride and sulfanilic acid, while the "carrier" or stabilizing components admixed therewith were changed in composition as indicated in Table 1. A qualitative comparison of results is reported in Table 2 wherein an arbitrary rating system was used, assigning numbers from 0 to 5 in increasing order of satisfactory result. From these tests certain conclusions can be drawn as to the nature of the carrier compositions suitable for the intended purpose. Apart from an initial requirement that the composition be essentially white in order not to mask small color changes and thus lower its useful indicator sensitivity, it is apparent that a weakly acidic environment is most beneficial in obtaining the desired pink or purple coloration indication. It is also apparent that a practically important characteristic of the carrier medium is the provision of uniform dispersion of microscopic amounts of available water affording a multitude of localized reaction sites for the diazotizing and coupling reactions which require aqueous medium. Water of crystallization from the addition of water to the powder mixture, or its presence in hydrated salts or by reason of the humectant properties of the glycerol, is thus important. Quite possibly the glycerol also exerts a stabilizing effect on account of its antioxidizing properties.

TABLE 1

| No. | Carrier-binder composition | Percent wt. active indicator | No. | Carrier-binder composition | Percent wt. active indicator |
|---|---|---|---|---|---|
| 1 | 4.5 gm. boric acid / 2.5 ml. glycerol | 6.7 | 2 | 7.0 gm. boric acid / 2.5 ml. glycerol | 5.0 |
| 3 | 4.5 gm. boric acid / 2.0 gm. silicic acid / 2.5 ml. glycerol | 5.3 | 4 | 4.5 gm. boric acid / 2.0 gm. talc / 2.5 ml. gloceryl | 5.3 |
| 5 | 4.5 gm. boric acid / 1.25 gm. "Cab-O-Sil M-5" (silica gel) / 2.5 ml. glycerol | 5.7 | 6 | 4.5 gm. boric acid / 1.0 gm. talc / 1.25 gm. "Cab-O-Sil" / 2.5 ml. glycerol | 5.1 |
| 7 | 4.5 gm. boric acid / 1.0 gm. talc / 1.0 gm. silicic acid / 2.5 ml. glycerol | 5.3 | 8 | 4.5 gm. boric acid / 2.0 gm. "Spackle" (plaster) / 2.5 gm. glycerol | 5.3 |
| 9 | 4.5 gm. boric acid / 2.5 ml. water-"Kelzan" paste (dextrin thickening agent) | 6.7 | 10 | 6.5 gm. talc / 2.5 ml. glycerol | 6.7 |
| 11 | 4.5 gm. boric acid / 2.0 gm. plaster (Kerr's modeling) / 2.5 ml. glycerol | 5.3 | 12 | 6.5 gm. citric acid / 1.0 gm. Cab-O-Sil / 2.5 ml. glycerol | 5.3 |
| 13 | 4.5 gm. citric acid / 4.0 gm. plaster / 2.5 ml. glycerol | 4.4 | 14 | 4.5 gm. MgSO₄ / 2.0 gm. plaster / 4.5 ml. glycerol | 4.4 |
| 15 | 1.0 gm. MgSO₄ / 1.0 gm. TiOSO₄ / 1.0 gm. plaster / 0.25 ml. glycerol / 1.0 ml. water | 10.5 | 16 | 4.5 gm. MgSO₄ (Epsom salts) / 1.0 ml. water | 8.4 |
| 17 | 4.5 gm. lime / 2.5 ml. glycerol | 6.7 | 18 | 2.5 gm. lime / 2.5 MgSO₄ (Epsom salts) / 2.0 ml. water / 0.5 ml. glycerol | 6.25 |
| 19 | 2.5 gm. MgSO₄ (Epsom salts) / 2.5 gm. TiOSO₄ / 1.0 gm. water / 0.25 gm. glycerol | 7.2 | 20 | 4.5 gm. MgSO₄ (Epsom salts) / 2.0 gm. plaster / 2.0 ml. glycerol | 5.6 |
| 21 | 4.0 gm. lime / 1.0 gm. HOCH₂PO₃H₂ / 1.0 ml. glycerol / 1.0 ml. water | 6.7 | 22 | 2.5 gm. MgSO₄ (Epsom salts) / 2.0 gm. C₆H₅PO₃H₂ / 0.5 ml. glycerol / 1.0 ml. water | 7.7 |
| 23 | 7.5 gm. boric acid / 2.5 gm. borax / 2.5 ml. glycerol | 3.8 | 24 | 4.5 gm. MgSO₄ (Epsom salts) / 2.0 ml Dequest 2000 (polyphosphonic acid of Monsanto Co.) | 7.1 |
| 25 | 4.5 gm. lime / 2.0 ml. Dequest 2000 | 7.1 | 26 | 2.0 gm. plaster / 3.0 gm. MgSO₄ / 0.25 ml. glycerol / 1.5 ml. water | 6.9 |

The foregoing description of various modifications in the compositions that are possible in the indicator are illustrative and representative of the best presently known embodiments of the invention. These provide a basis for understanding the invention and it will be understood accordingly that within the scope of the appended claims the invention may be practiced otherwise than as specifically described.

What is claimed is:

1. An indicator composition for use in detecting nitrogen dioxide in an atmosphere, which comprises in combination an intimate admixture of relatively minor amounts of at least one member each of component groups A and B, wherein Group A consists of N(1-naphthyl) ethylenediamine dihydrochloride and N(1-ethylenediamine acetate, and Group B consists of sulfanilic acid and sulfanilimide; a major amount of a pulverulent stabilizing agent, said agent consisting essentially of one member selected from the group consisting of boric acid and magnesium sulfate, said agent being weakly acidic in aqueous solution and essentially white in color, said agent in the admixed indicator composition incorporating uniformly dispersed microscopic amounts of available water providing a multitude of localized reaction sites for diazotization and coupling reactions when the composition is exposed to an atmosphere contaminated with nitrogen dioxide; together with sufficient non-reactive liquid binder to form said indicator composition into a self-supporting compact.

2. A composition as defined in claim 1, wherein the stabilizing agent consists essentially of boric acid and an inert whitener selected from the group consisting of fine mesh silica, lime, and talc.

3. A composition as defined in claim 1, wherein the stabilizing agent consists essentially of magnesium sulfate and an inert whitener selected from the group consisting of fine mesh silica, lime, and talc.

4. An indicator composition as defined in claim 1, wherein the stabilizing agent consists essentially of a material selected from the group consisting of boric acid and magnesium sulfate together with at least one mem-

TABLE 2

| No. | Texture | Initial color | NO₂ response | Stability in Dark | Stability in Light | Aged response | Comments |
|---|---|---|---|---|---|---|---|
| 1 | 1 | 2 | 1 | 1 | 0 | | Sl. gassing. |
| 2 | 3 | 3 | 4 | 1 | 0 | | Do. |
| 3 | 4 | 3 | 3 | 1 | 0 | | |
| 4 | 4 | 3 | 3 | 2 | 1 | | |
| 5 | 0 | 0 | 0 | 0 | 0 | | |
| 6 | 5 | 5 | 2 | 4 | 4 | 4 | |
| 7 | 4 | 4 | 3 | 2 | 1 | | |
| 8 | 3 | 3 | 5 | 1 | 0 | | Sl. gassing fast response. |
| 9 | 2 | 2 | 3 | 0 | 0 | | |
| 10 | 4 | 3 | 4 | 3 | 1 | | Sl. gassing. |
| 11 | 4 | 3 | 2 | 2 | 1 | | Do. |
| 12 | 1 | 5 | 1 | 5 | 4 | 0 | |
| 13 | 0 | 2 | 0 | 2 | 2 | | |
| 14 | 3 | 4 | 5 | 4 | 4 | 4 | |
| 15 | 4 | 3 | 2 | 3 | 3 | 0 | |
| 16 | 4 | 4 | 3 | 0 | 0 | | |
| 17 | 2 | 2 | 0 | 3 | 3 | | Yellow resp. |
| 18 | 4 | 0 | 0 | 1 | 1 | | |
| 19 | 4 | 3 | 3 | 2 | 1 | | Sl. gassing. |
| 20 | 3 | 3 | 4 | 0 | 0 | | Yellow resp. |
| 21 | 4 | 0 | 0 | 1 | 0 | | |
| 22 | 4 | 4 | 4 | 1 | 0 | | |
| 23 | 4 | 3 | 4 | 0 | 0 | | Pink resp. turned green. |
| 24 | 4 | 3 | 2 | 4 | 1 | | |
| 25 | 4 | 2 | 0 | 0 | 0 | | Yellow resp. |
| 26 | 5 | 4 | 5 | 4 | 4 | 5 | | ber selected from the group consisting of fine mesh silica, lime, and talc.

References Cited

UNITED STATES PATENTS

| | | | |
|---|---|---|---|
| 2,283,262 | 5/1942 | Kamlet | 23—230 |
| 2,789,232 | 4/1957 | Block | 250—83 PH |
| 2,963,351 | 12/1960 | Stanford et al. | 23—232 |
| 3,232,710 | 2/1966 | Rieckmann et al. | 23—253 TP |
| 3,375,079 | 3/1968 | Lyshkow | 23—232 |

MORRIS O. WOLK, Primary Examiner

R. M. REESE, Assistant Examiner

U.S. Cl. X.R.

23—253 TP, 254; 252—408